(12) United States Patent
Jeffryes

(10) Patent No.: US 9,551,798 B2
(45) Date of Patent: Jan. 24, 2017

(54) SEISMIC VIBRATOR TO PRODUCE A CONTINUOUS SIGNAL

(75) Inventor: Benjamin P. Jeffryes, Cambridge (GB)

(73) Assignee: WESTERNGECO L.L.C., Houston, TX (US)

( * ) Notice: Subject to any disclaimer, the term of this patent is extended or adjusted under 35 U.S.C. 154(b) by 1465 days.

(21) Appl. No.: 13/011,013

(22) Filed: Jan. 21, 2011

(65) Prior Publication Data

US 2012/0188845 A1 Jul. 26, 2012

(51) Int. Cl.
*G01V 1/00* (2006.01)

(52) U.S. Cl.
CPC ..................... *G01V 1/005* (2013.01)

(58) Field of Classification Search
CPC ..................................................... G01V 1/005
USPC ................................ 367/46, 39–42
See application file for complete search history.

(56) References Cited

U.S. PATENT DOCUMENTS

| | | | | |
|---|---|---|---|---|
| 3,568,142 A * | 3/1971 | Landrum et al. | | 367/43 |
| 3,618,000 A * | 11/1971 | Carruth, Jr. | | 367/79 |
| 3,678,452 A * | 7/1972 | Silverman | | 367/8 |
| 4,159,463 A * | 6/1979 | Silverman | | 367/59 |
| 4,511,999 A * | 4/1985 | Bowden et al. | | 367/23 |
| 4,686,655 A * | 8/1987 | Hyatt | | 367/59 |
| 4,944,036 A * | 7/1990 | Hyatt | | 367/43 |
| 5,053,983 A * | 10/1991 | Hyatt | | 708/306 |
| 5,400,299 A | 3/1995 | Trantham | | |
| 5,715,213 A * | 2/1998 | Allen | | 367/48 |
| 5,757,726 A | 5/1998 | Tenghamn et al. | | |
| 6,464,035 B1 | 10/2002 | Chelminski | | |
| 7,515,505 B2 | 4/2009 | Krohn et al. | | |
| 7,636,275 B2 * | 12/2009 | Anno et al. | | 367/21 |
| 7,859,945 B2 * | 12/2010 | Sallas et al. | | 367/190 |
| 2003/0210609 A1 * | 11/2003 | Jeffryes | | 367/14 |
| 2005/0057392 A1 | 3/2005 | Blunt et al. | | |
| 2009/0010103 A1 | 1/2009 | Sallas et al. | | |
| 2009/0168600 A1 | 7/2009 | Moore et al. | | |
| 2010/0085836 A1 * | 4/2010 | Bagaini et al. | | 367/41 |
| 2011/0205845 A1 * | 8/2011 | Quigley | | 367/50 |

OTHER PUBLICATIONS

International Search Report and Written Opinion of PCT Application No. PCT/US2012/021790 dated Aug. 28, 2012: pp. 1-11.

* cited by examiner

*Primary Examiner* — Luke Ratcliffe
*Assistant Examiner* — Hovhannes Baghdasaryan
(74) *Attorney, Agent, or Firm* — Kevin B. McGoff

(57) ABSTRACT

A seismic vibrator receives a pilot signal having a predetermined waveform. The pilot signal causes vibrational actuation of at least one moveable element of the seismic vibrator. A continuous seismic signal having content in a first frequency bandwidth of multiple frequencies is generated by the seismic vibrator.

24 Claims, 2 Drawing Sheets

SEISMIC VIBRATOR TO PRODUCE A CONTINUOUS SIGNAL

BACKGROUND

Seismic surveying is used for identifying subterranean elements, such as hydrocarbon reservoirs, freshwater aquifers, gas injection zones, and so forth. In seismic surveying, seismic sources (such as seismic vibrators or other types of sources) are placed at various locations on a land surface or sea floor, with the seismic sources activated to generate seismic waves directed into a subterranean structure.

The seismic waves generated by a seismic source travel into the subterranean structure, with a portion of the seismic waves reflected back to the surface for receipt by seismic receivers (e.g., hydrophones, geophones, accelerometers, etc.). These seismic receivers produce signals that represent detected seismic waves. Signals from seismic receivers are processed to yield information about the content and characteristic of the subterranean structure.

SUMMARY

In general, in accordance with some embodiments, a seismic vibrator receives a pilot signal having a predetermined waveform. The pilot signal causes vibrational actuation of at least one moveable element of the seismic vibrator. A continuous seismic signal having content in a first frequency bandwidth of multiple frequencies is generated by the seismic vibrator.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Figure 1:
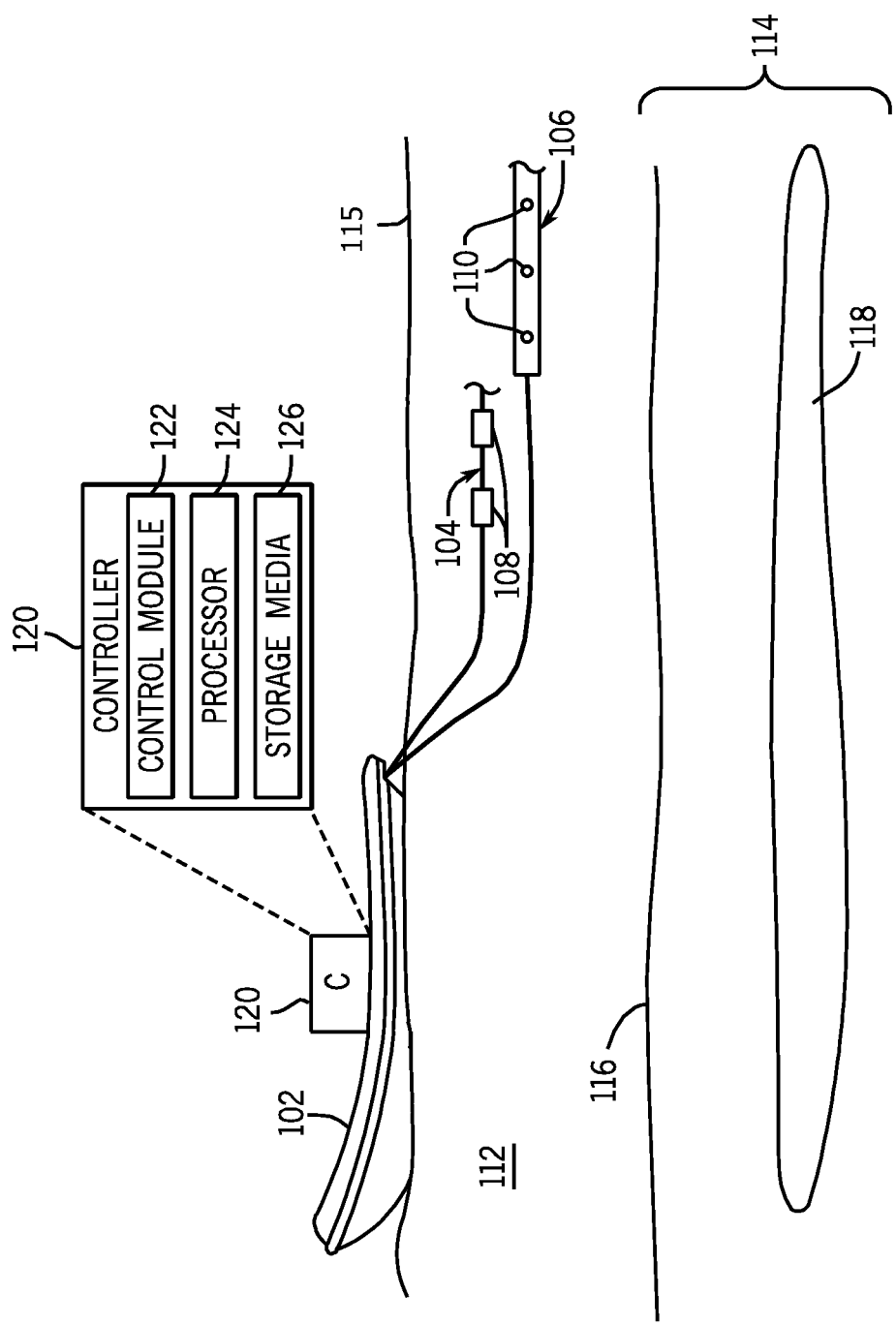
FIG. 1 is a schematic diagram of an example arrangement for performing a seismic survey, in accordance with some embodiments.

In seismic surveying, a seismic source is used to produce seismic signals that are propagated into a subterranean structure. In some implementations, the seismic source can be in the form of a seismic vibrator, which has at least one moveable element that is actuated to oscillate between different positions to cause vibrations that cause production of seismic signals that are propagated into the subterranean structure.

Typically, a seismic vibrator emits swept-frequency signals, where the signals output by the seismic vibrator are swept from a first frequency to a second frequency. The signal sweep that is produced by the seismic vibrator may be an oscillating signal of a continuously varying frequency, increasing or decreasing monotonically within a given frequency range. The frequency of the seismic sweep may start low and increase with time (an upsweep) or the frequency may being high and gradually decrease (a downsweep). To produce the frequency sweep, the control input to the seismic vibrator includes input signals that sweep across frequencies from a first frequency to a second frequency (the "sweep range"). With swept-frequency signals, a short section of the output acoustic (seismic) signal from the seismic vibrator does not contain content from the entire sweep range, but is restricted to a smaller bandwidth.

In accordance with some embodiments, instead of producing swept-frequency seismic signals, a seismic vibrator produces a continuous seismic signal that has content over a predetermined frequency bandwidth (that includes a range of multiple frequencies). A substantial section (e.g. 50% or less) of the continuous seismic signal will have frequency content over substantially the entire predetermined bandwidth, in contrast to a swept-frequency signal where the bandwidth of that section will be smaller than the entire source bandwidth. For example, if the sweep-rate of the swept-frequency signal is constant, the bandwidth of half of the signal will be close to one half of the bandwidth of the entire signal. For non-linear sweeps, the fraction may be greater or less than half. During normal land seismic vibrator acquisition, both the vibrator and the seismic receivers are stationary during the sweep; thus all the data from one sweep corresponds to a single shot point and a single receiver point. Some embodiments of the invention apply to seismic acquisition where the vibratory source may be activated while either the source is moving, or at least some of the receivers are moving, or both. An example is marine acquisition where the source is towed behind a vessel, and the receivers may either be towed or stationary. Another example is transition zone acquisition where the source may be on-land and stationary and the receivers on the water and moving—or vice-versa. Moving sources and receivers are also possible on land—techniques according to some implementations are also applicable to such arrangements.

As used here, "continuous" is intended to refer to continuous or near continuous. A continuous seismic signal produced by the seismic vibrator in a seismic survey means that the seismic vibrator is continuously on (activated) during the seismic survey. However, continuous also refers to situations where the seismic vibrator is not activated during the entire seismic survey. For example, the seismic vibrator can be activated for a sufficiently length of time such that the seismic vibrator continuously outputs a seismic signal for multiple shot points. In typical survey, shot points are 25 meters apart. In one example, if a marine vessel towing the seismic vibrator and seismic receivers covers 200 m while the seismic vibrator is outputting a signal, then eight different shot points are produced and thus the seismic vibrator in this example would be considered to produce a near-continuous seismic signal. In some implementations, the continuous seismic signal with content over the predetermined frequency bandwidth is designed so that the autocorrelation of the signal drops off with time.

To activate the seismic vibrator according to some embodiments, a pilot signal having a predetermined waveform is provided to the seismic vibrator. In some implementations, the pilot signal is in the form of a time series (e.g., a time t, the output is f(t), where f( ) is a predefined function). The pilot signal controls actuation of the seismic vibrator. The continuous seismic signal output by the seismic vibrator generally follows the predetermined waveform of the pilot signal. In some implementations, control circuitry in the seismic vibrator may include a feedback control loop that attempts to minimize or reduce the difference between the pilot signal and the output signal (the continuous seismic signal) of the seismic vibrator.

FIG. 1 is a schematic diagram of an example seismic survey arrangement that performs seismic surveying in a marine environment. Note that seismic vibrators according to some implementations can also be used in a land-based seismic survey.

As depicted in FIG. 1, a marine vessel 102 tows a seismic source assembly 104 and a seismic receiver assembly 106. In the example of FIG. 1, the seismic source assembly 104 includes multiple seismic sources 108 that are moving during a survey operation. In a different implementation, the seismic source assembly 104 can include just one seismic source. The seismic receiver assembly 106 is typically in the form of a streamer having multiple seismic receivers 110. Although depicted as being towed by one marine vessel 102, it is noted that different marine vessels can tow the seismic source assembly 104 and the seismic receiver assembly 106, respectively. Alternatively, multiple seismic sources 108 can be towed by different marine vessels.

The seismic source assembly 104 and seismic receiver assembly 106 are towed through a body of water 112 underneath a water surface 115. Seismic signals generated by the seismic sources 108 are propagated into a subterranean structure 114 underneath a water bottom surface 116 (e.g., a sea floor). The subterranean structure 114 includes a subterranean element 118 of interest, which can be a hydrocarbon reservoir, fresh water aquifer, a gas injection zone, and so forth.

Seismic signals reflected from the subterranean structure 114 are detected by the seismic receivers 110 in the seismic receiver assembly 106. The recorded seismic measurements at the seismic receivers 110 are provided for analysis to characterize the content of the subterranean structure 114.

As further depicted in FIG. 1, a controller 120 is provided at the marine vessel 102. The controller 120 has a control module 122 executable on one or multiple processors 124, which is (are) connected to storage media 126. The controller 120 can be used to control activation of the seismic sources 108, and also, can be used to receive seismic measurements from the seismic receiver assembly 106.

Figure 2:
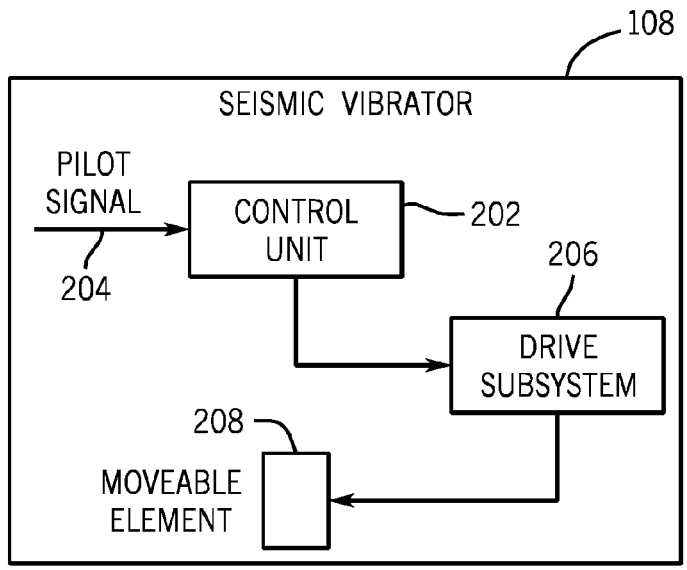
FIG. 2 is a block diagram of a seismic vibrator according to some embodiments.

In accordance with some embodiments, at least one of the seismic sources 108 is a seismic vibrator that is able to produce a continuous seismic signal, as opposed to a swept-frequency seismic signal. FIG. 2 depicts an example arrangement of a seismic vibrator 108, which has a control unit 202 for receiving a pilot signal 204 of a predetermined waveform. In the FIG. 1 arrangement, the pilot signal 204 can be received from the controller 120 over a communications link (e.g., electrical cable, optical fiber link, wireless link, etc.).

The control unit 202 controls a drive subsystem 206 that controls actuation of at least one moveable element 208 in the seismic vibrator 108. In accordance with some embodiments, the pilot signal 204 is not a swept-frequency control signal, but rather, is a continuous signal that has content in a predetermined frequency bandwidth. In response to such pilot signal 204, the control unit 202 in the seismic vibrator 108 generates a control signal to the drive subsystem 206.

The actuation of the moveable element 208 causes a back-and-forth (oscillating) movement of the moveable element 208, which can cause generation of an output seismic signal. In some examples, the moveable element 208 impacts an impact member of the seismic vibrator 108, which causes the production of the output seismic signal. Alternatively, the back-and-forth movement of the moveable element 208 causes liquids to be forcefully provided through one or more ports of the seismic vibrator 108 that causes production of the output seismic signal. As noted above, the output seismic signal from the seismic vibrator 108 is a continuous seismic signal that generally follows the pilot signal, and that has content in a predetermined frequency bandwidth (of multiple frequencies).

In implementations with multiple seismic vibrators 108, the pilot signals used to control the respective seismic vibrators 108 can have one or more of the following characteristics. In some implementations, the same pilot signal is used to control multiple seismic vibrators 108, such that the multiple seismic vibrators produce continuous seismic signals with content over the same predetermined frequency bandwidth.

Alternatively, the pilot signals used to control respective seismic vibrators 108 can follow pilot signals with different frequency bandwidths, with no overlap between the frequency bandwidths. For example, a first pilot signal can have a frequency range between 5 and 40 hertz, whereas the second pilot signal can have a frequency range between 45 and 60 hertz.

In alternative implementations, there can be overlap between the frequency bandwidths. In such implementations, the different frequency bandwidths are chosen such that within the frequency range in which the pilot signals overlap, there is a relatively low cross-correlation between the pilot signals in the overlapping frequency range.

In other implementations, the multiple seismic vibrators 108 can follow pilot signals that have the same frequency bandwidth, but which have relatively low peak cross-correlation with one another. To achieve the low peak cross-correlation between pilot signals in the same frequency bandwidth, data can be spread out over time, such as by using different pseudorandom coding. For example, if there are N pilot signals for N seismic vibrators, where N≥2, then the N pilot signals can have the same frequency bandwidth, but different pseudorandom coding can be applied to each of the N pilot signals to provide relatively low peak cross-correlation between the pilot signals.

In operation, the seismic vibrator 108 (or multiple seismic vibrators 108) are operated continuously, and receiver signals are recorded continuously. To recover an impulse response from a received signal, a procedure according to FIG. 3 can be followed, in accordance with some embodiments. The procedure of FIG. 3 can be performed by the control module 122 in FIG. 1, for example. A first time window is applied (at 302) to a representation of the output continuous seismic signal produced by a seismic vibrator 108. The time window starts at a starting time ($t_1$) and ends at an ending time ($t_2$). The application of the first time window can be implemented by application of a pulse (e.g., 303 depicted in FIG. 3, which starts at $t_1$ and ends at $t_2$) to the representation of the output continuous seismic signal. In some implementations, the rising edge and falling edge of the first time window (e.g., pulse 303) can be smoothed. An example of a time window with smooth edges can be a cosine window. In further implementations, multiple time windows can be used to provide un-aliased spatial sampling.

Application of the pulse 303 to the representation of the output continuous seismic signal results in allowing content of the representation within the pulse 303 (within the first time window) to pass, while the content of the representation outside the first time window is attenuated.

The representation of the output continuous seismic signal can be the pilot signal itself, or alternatively, the representation of the output continuous seismic signal can be a control signal measured inside the seismic vibrator 108, such as the control signal output by the control unit 202 shown in FIG. 2. As yet another alternative, the representation of the output continuous seismic signal can be a signal measured by a sensor proximate the seismic vibrator 108.

The sensor can be a hydrophone, for example. The near-field hydrophone measurement can be processed into a far-field signal, in accordance with some implementations. Alternatively, some combination of the foregoing waveforms can be used as the representation of the output continuous seismic signal.

It is noted that the selection of the first time window (and more specifically, selection of starting and ending time points $t_1$ and ends at $t_2$) can be based on a target location of interest at which receiver measurement data is to be collected for processing.

Figure 3:
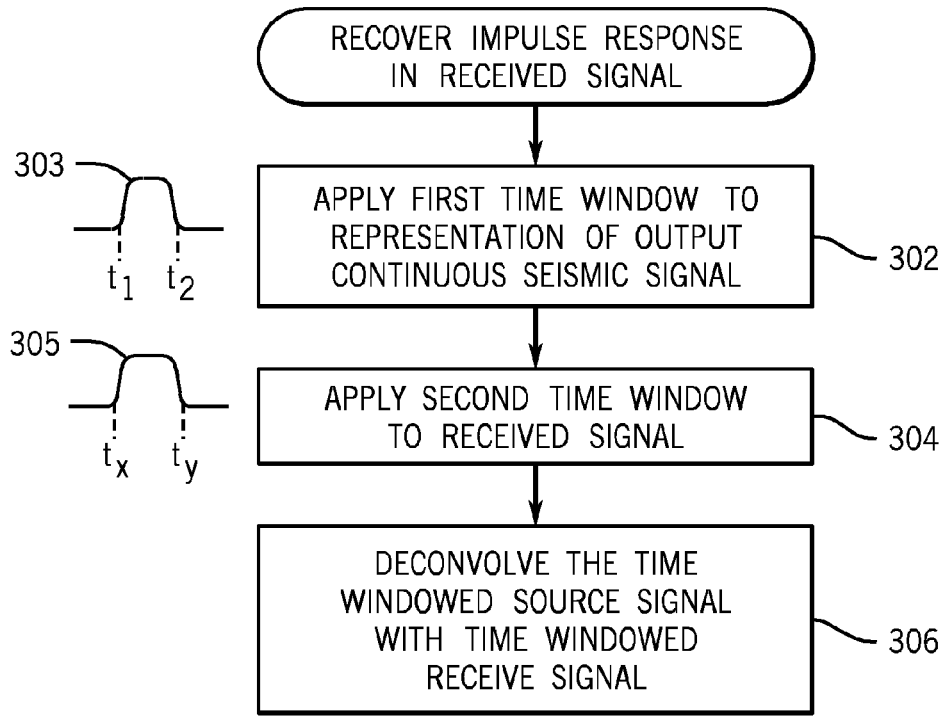
FIG. 3 is a flow diagram of a process performed according to some embodiments.

The procedure of FIG. 3 further applies (at 304) a second time window (e.g., pulse 305) to the received signal (as received by a receiver). In some implementations, the second time window contains the first time window; in other words, the second time window (having start time $t_x$ and end time $t_y$) can be larger than the first time window, with the first time window inside the second time window, or the second time window can have the extent (same time length) as the first time window ($t_x=t_1$ and $t_y=t_2$, for example). Alternatively, the start ($t_x$) of the second time window can be delayed from the start ($t_1$) of the first time window by no longer than the minimum travel time between the seismic source and the seismic receiver. In such an implementation, the end ($t_y$) of the second time window can be the end ($t_2$) of the first time window, plus the maximum two-way time desired to be preserved in the impulse response. The edges (rising edge and falling edge) of the second time window (e.g., pulse 305) can also be smoothed to reduce appearance of artifacts.

In other implementations, multiple first time windows and multiple second time windows can be applied at 302 and 304, respectively, where the multiple first time windows can overlap, and the multiple second time windows can overlap. This provides multiple overlapping shot points.

The procedure of FIG. 3 then deconvolves (at 306) the time windowed source signal (output of 302) with the time windowed receive signal (output of 304), to produce an output signal. One technique of performing the deconvolution is to use cross-correlation as a surrogate for deconvolution, where the time windowed receive signal is cross-correlated with the time windowed source signal. This can work effectively if the representation of the output continuous seismic signal is the pilot signal, since the pilot signal is designed not to have significant auto-correlation side lobes that may be present in a measured source waveform.

Alternatively, the deconvolution can be performed by creating a band-limited inverse of the source waveform, with sufficient spectral whitening to remove anomalies created by nulls or near-nulls in the source spectrum. The nulls or near-nulls may arise due to failure of a seismic vibrator to follow the pilot signal exactly.

A band-limited inverse of the source waveform is discussed below.

Assume there is a function in the frequency domain S(f) such that for $f<f_0$ and $f>f_1$, S(f)=0. The received signal, R(f), looks like $$R(f)=I(f) \cdot S(f)+N(f),$$

where I(f) is a function of frequency f, and N(f) is a noise term. In order to estimate I(f), R(f) is multiplied by the inverse of S(f), but without amplifying the noise.

The band-limited inverse of S(f), $S^I(f)$, is defined by:

For $f < f_0$ $S^I(f) = 0$,

For $f_0 < f < f_2$, where $f_2 > f_0$, $S^I(f) = \frac{r_L(f)}{S(f)}$,

For $f_2 < f < f_3$, where $f_2 < f_3 < f_1$, $S^I(f) = \frac{1}{S(f)}$,

For $f_3 < f < f_1$, $S^I(f) = \frac{r_H(f)}{S(f)}$

For $f > f_1$, $S^I(f) = 0$.

The functions $r_L(f)$ and $r_H(f)$ are smooth ramps, examples of which are:

$$r_L(f) = \left[\frac{1}{2}\left(1 - \cos\left(\frac{\pi(f - f_0)}{f_2 - f_0}\right)\right)\right]^N,$$

$$r_H(f) = \left[\frac{1}{2}\left(1 - \cos\left(\frac{\pi(f_1 - f)}{f_1 - f_3}\right)\right)\right]^N,$$

where N is a positive number, normally one, but which can be higher or lower if more or less smoothness is desired.

The product of S(f) and its band-limited inverse $S^I(f)$ will thus be zero outside of $f_0$ and $f_1$, $r_L$, between $f_0$ and $f_2$, 1 between $f_2$ and $f_3$, $r_H$ between $f_3$ and $f_1$, and 0 for frequencies greater than $f_1$.

Although this describes a band-limited inverse according to a prescription in the frequency domain, this is by way of an example and other methods for designing a band-limited inverse can be used in both time and frequency domains.

If the seismic receivers 110 of FIG. 1 are moving along with the seismic source(s) 108, then it may be desired to transform the data to that of a static receiver at a particular location. This is possible if the seismic receivers are sufficiently densely sampled. The transformation can be performed prior to step 304, or after step 306, in FIG. 3.

Using techniques according to some embodiments, shot positions and separation do not have to be decided on until after the seismic acquisition has been performed. Relatively good spatial frequency domain filtering can be performed if overlapping shots are used. For different frequency ranges, and/or for different subterranean locations, different shot positions and spacings can be employed—in other words, the same data can be used for multiple different types of surveys. For example, the same data can be used for high-resolution shallow hazardous survey, a medium resolution medium depth survey for performing well planning in a known reservoir, or a low resolution deep survey for potential future exploration targets.

When multiple seismic vibrators are in use simultaneously, the deconvolution function will attenuate the effect of one seismic vibrator's signal on the impulse function of another seismic vibrator. Since deconvolution is a linear process, a statistically flat background noise level with a bandwidth of the overlap of the bandwidths of the seismic vibrators can be achieved. Alternatively, joint inversion can be performed that can separate interfering signals, based on subterranean models, transformations such as Radon transforms, and variation in source timings between different signals.

Implementations can employ towed seismic sources, or implementations can be employed where one or more of the seismic sources are static and the receivers are towed. For example, one seismic source can be on the seafloor while another is towed.

Techniques or mechanisms according to some embodiments are also applicable for moving, continuous land-based vibrator source, such as a shaking truck.

The various processing discussed herein can be performed by the control module 122 of FIG. 1, which can be implemented with machine-readable instructions that are loaded for execution on processor(s) 124. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   receiving, by a control unit of a seismic vibrator, a non-frequency-swept pilot signal having a predetermined waveform;
   in response to the pilot signal, the control unit causing vibrational actuation of at least one moveable element of the seismic vibrator; and
   generating, by the seismic vibrator due to the vibrational actuation of the at least one moveable element, a first continuous seismic signal having content in a first frequency bandwidth of multiple frequencies.

2. The method of claim 1, wherein the continuous seismic signal generally follows the predetermined waveform of the pilot signal.

3. The method of claim 1, further comprising:
   providing a second seismic vibrator that is also activated by the pilot signal.

4. The method of claim 1, further comprising:
   providing a second seismic vibrator that is activated by a second, different pilot signal; and
   generating, by the second seismic vibrator, a second continuous seismic signal having content in a second, different frequency bandwidth of multiple frequencies.

5. The method of claim 1, further comprising:
   providing a second seismic vibrator that is activated by a second, different pilot signal, wherein different codes are applied to the first and second pilot signals; and
   generating, by the second seismic vibrator, a second continuous seismic signal having content in the first frequency bandwidth.

6. The method of claim 1, further comprising:
   to recover an impulse response from a received signal based on the first continuous seismic signal,
      applying a first time window to a representation of the first continuous seismic signal;
      applying a second time window to the received signal; and
      deconvolve the time-windowed representation of the first continuous seismic signal with the time-windowed received signal.

7. The method of claim 6, further comprising:
   applying multiple first time windows to the representation of the first continuous seismic signal; and
   applying multiple second time windows to the received signal,
   wherein the multiple first time windows overlap, and the multiple second time windows overlap.

8. The method of claim 6, wherein the second time window contains the first time window.

9. The method of claim 6, wherein the representation of the first continuous seismic signal comprises one or a combination of:
   (1) the pilot signal, or
   (2) a signal measured in the seismic vibrator, or
   (3) a signal measured by a sensor proximate the seismic vibrator.

10. The method of claim 6, wherein the deconvolving comprises cross-correlating the time-windowed representation and the time-windowed received signal.

11. The method of claim 6, wherein the deconvolving comprises:
    creating a band-limited inverse of the representation of the first continuous seismic signal.

12. The method of claim 6, further comprising:
    transforming the received signal into data corresponding to a static receiver, wherein the received signal is received by a receiver that was moving.

13. The method of claim 1, wherein the seismic vibrator is in motion during generation of the first continuous seismic signal.

14. A system comprising:
    a seismic vibrator having a control unit and at least one moveable element, wherein the control unit is responsive to a pilot signal to cause oscillating movement of the at least one moveable element, wherein the pilot signal has a predetermined waveform with content at multiple frequencies within a first frequency bandwidth,
    wherein oscillating movement of the at least one moveable member is to cause generation of a first continuous seismic signal having content in the first frequency bandwidth, wherein the first continuous seismic signal having the content in the first frequency bandwidth is generated without sweeping the pilot signal across the frequencies of the first frequency bandwidth.

15. The system of claim 14, further comprising a controller to provide the pilot signal to the seismic vibrator.

16. The system of claim 14, further comprising:
    a second seismic vibrator that is activatable by the pilot signal to produce a second continuous seismic signal having content in the first frequency bandwidth.

17. The system of claim 14, further comprising:
a second seismic vibrator that is activated by a second, different pilot signal that has content at multiple frequencies in a second, different frequency bandwidth, wherein the second seismic vibrator is responsive to the second pilot signal to produce a second continuous seismic signal having content in the second frequency bandwidth.

18. The system of claim 14, further comprising:
a second seismic vibrator that is activated by a second, different pilot signal having content in the first frequency bandwidth, wherein different codes are applied to the first and second pilot signals, wherein the second seismic vibrator is responsive to the second pilot signal to produce a second continuous seismic signal having content in the first frequency bandwidth.

19. The system of claim 14, further comprising:
a controller to recover an impulse response from a received signal based on the first continuous seismic signal, wherein the controller is to recover the impulse response by
applying a first time window to a representation of the first continuous seismic signal;
applying a second time window to the received signal; and
deconvolve the time-windowed representation of the first continuous seismic signal with the time-windowed received signal.

20. The system of claim 19, wherein the representation of the first continuous seismic signal comprises one or a combination of:
(1) the pilot signal, or
(2) a signal measured in the seismic vibrator, or
(3) a signal measured by a sensor proximate the seismic vibrator.

21. An article comprising at least one computer-readable storage medium storing instructions that upon execution cause a system having a processor to:
send a non-frequency-swept pilot signal to a seismic vibrator, wherein the pilot signal has a predetermined waveform having content at multiple frequencies in a predetermined frequency bandwidth, wherein the seismic vibrator is responsive to the pilot signal to generate a continuous seismic signal having content at multiple frequencies in the predetermined frequency bandwidth; and
process a signal received by a seismic receiver in response to the continuous seismic signal.

22. The article of claim 21, wherein processing the signal comprises recovering an impulse response from the received signal, wherein recovering the impulse response comprises:
applying a first time window to a representation of the continuous seismic signal;
applying a second time window to the received signal; and
deconvolve the time-windowed representation of the first continuous seismic signal with the time-windowed received signal.

23. The method of claim 1, wherein the first continuous seismic signal having the content in the first frequency bandwidth is generated without sweeping the pilot signal across the frequencies of the first frequency bandwidth.

24. The article of claim 21, wherein the continuous seismic signal having the content in the predetermined frequency bandwidth is generated without sweeping the pilot signal across the multiple frequencies in the predetermined frequency bandwidth.

* * * * *